United States Patent
Kawasaki

(10) Patent No.: US 8,115,342 B2
(45) Date of Patent: Feb. 14, 2012

(54) VEHICLE POWER SUPPLY APPARATUS AND VEHICLE WINDOW MEMBER

(75) Inventor: Koji Kawasaki, Anjo (JP)

(73) Assignees: Toyota Jidosha Kabushiki Kaisha, Toyota-Shi (JP); Nippon Soken, Inc., Nighio-Shi (JP)

( * ) Notice: Subject to any disclaimer, the term of this patent is extended or adjusted under 35 U.S.C. 154(b) by 83 days.

(21) Appl. No.: 12/356,644

(22) Filed: Jan. 21, 2009

(65) Prior Publication Data
US 2009/0189458 A1 Jul. 30, 2009

(30) Foreign Application Priority Data
Jan. 23, 2008 (JP) ................................. 2008-012848

(51) Int. Cl.
*H01F 27/42* (2006.01)
*H01F 37/00* (2006.01)
*H01F 38/00* (2006.01)
(52) U.S. Cl. ......... 307/104; 307/9.1; 307/10.1; 333/195
(58) Field of Classification Search .................... 307/104
See application file for complete search history.

(56) References Cited

U.S. PATENT DOCUMENTS

| | | | | |
|---|---|---|---|---|
| 4,764,773 A | * | 8/1988 | Larsen et al. | 343/713 |
| 5,612,652 A | * | 3/1997 | Crosby | 333/24 R |
| 5,619,078 A | | 4/1997 | Boys et al. | |
| 5,696,409 A | * | 12/1997 | Handman et al. | 307/10.1 |
| 5,703,461 A | * | 12/1997 | Minoshima et al. | 320/108 |
| RE36,076 E | * | 2/1999 | Bryant et al. | 343/713 |
| 5,898,579 A | | 4/1999 | Boys et al. | |
| 6,320,352 B2 | * | 11/2001 | Terazoe | 320/108 |
| 2002/0117896 A1 | * | 8/2002 | Gohara | 307/10.1 |

FOREIGN PATENT DOCUMENTS

| | | |
|---|---|---|
| JP | 06245326 | 9/1994 |
| JP | 06425326 | 9/1994 |
| JP | 09182212 | 7/1997 |
| JP | 1028332 | 1/1998 |
| JP | 2000067194 | 3/2000 |
| JP | 2001309579 | 11/2001 |
| JP | 2004222457 | 8/2004 |
| JP | 2004229421 | 8/2004 |

OTHER PUBLICATIONS

JP Patent 04-343501 to Ichihara et al.—english abstract, Nov. 30, 1992.*
WO Pub 2005/124962 to Tetlow et al., Dec. 29, 2005.*

* cited by examiner

*Primary Examiner* — Rexford Barnie
*Assistant Examiner* — Justen Fauth
(74) *Attorney, Agent, or Firm* — Gifford, Krass, Sprinkle, Anderson & Citkowski, P.C.

(57) ABSTRACT

The vehicle power supply apparatus 100 has a power transmitting unit 110 including a power transmission side coil 111 for generating an alternating magnetic field, a positioning member 112 for positioning the power transmission side coil 111 in a vehicle 20, and a power transmission side circuit 114 supplying an electric current to the power transmission side coil 111; and a power receiving unit 120 including a power receipt side coil 121 disposed in a rear window member 30 which is a non-magnetic portion of the vehicle 20 and generating an induced current based on an alternating magnetic field generated by the power transmission side coil 111 and a power receipt side circuit 122 supplying, to a power-supplied object, electric power based on the induced current generated by the power receipt side coil 121.

10 Claims, 5 Drawing Sheets

121B

VEHICLE POWER SUPPLY APPARATUS AND VEHICLE WINDOW MEMBER

BACKGROUND OF THE INVENTION

1. Field of the Invention

The present invention relates to a vehicle power supply apparatus supplying electric power from outside a vehicle to a predetermined power-supplied object mounted on the vehicle by electromagnetic induction and a vehicle window member.

2. Description of the Prior Art

Conventionally, as a system supplying electric power from a power supply apparatus on a ground side to a battery mounted on a vehicle, there has been known an automatic charging system charging a battery by supplying electric power from outside the vehicle to the vehicle side by electromagnetic induction between a power receipt side coupler disposed on a front bottom surface of the vehicle and a power transmission side coupler of the power supply apparatus (for example, see Japanese Patent Laid-Open No. 09-182212). If a small positional misalignment occurs between the power transmission side coupler and the power receipt side coupler, this automatic charging system uses a movable arm to move the power transmission side coupler to the power receipt side coupler so that the power transmission side coupler and the power receipt side coupler are positioned in a chargeable position. Further, if even the positional correction by the movable arm fails to change the positional relation between the power transmission side coupler and the power receipt side coupler into a chargeable position, the automatic charging system notifies the driver of this effect to prompt the driver to move the vehicle to a more appropriate position.

According to the above automatic charging system, if the positional misalignment between the power transmission side coupler and the power receipt side coupler exceeds an allowable range, the movable arm cannot correct the position of the power transmission side coupler. For this reason, the driver has to move the vehicle many times based on the notification until the power transmission side coupler and the power receipt side coupler are positioned in a chargeable position.

SUMMARY OF THE INVENTION

In view of this, a major object of the vehicle power supply apparatus and the vehicle window member of the present invention is to provide a vehicle power supply apparatus capable of supplying electric power in an easy and efficient manner to a power-supplied object mounted on the vehicle and a vehicle window member applied to the power supply apparatus.

In order to achieve the above major object, the vehicle power supply apparatus and the vehicle window member of the present invention adopts the following means.

The present invention is directed to a vehicle power supply apparatus supplying electric power by electromagnetic induction from outside a vehicle to a predetermined power-supplied object mounted in the vehicle. The vehicle power supply apparatus includes: a power transmitting unit including a power transmission side coil for generating an alternating magnetic field, a positioning device for positioning the power transmission side coil with respect to the vehicle, and a power transmission side circuit supplying electric current to the power transmission side coil; and a power receiving unit including a power receipt side coil disposed in a non-magnetic portion of the vehicle and generating induced current based on the alternating magnetic field generated by the power transmission side coil, and a power receipt side circuit supplying electric power based on the induced current generated by the power receipt side coil to the power-supplied object.

According to this vehicle power supply apparatus, the positioning unit is used to position the power transmission side coil in a non-magnetic portion of the vehicle, thereby easily changing the positional relation between the power transmission side coil and the power receipt side coil to a chargeable position. In addition, since the power receipt side coil is disposed in a non-magnetic portion of the vehicle, a magnetic flux generated by the power transmission side coil may be less affected by a magnetic flux occurring from a magnetic portion of the vehicle and can be easily passed through inside the power receipt side coil, thereby allowing an efficient power transfer between the power transmission side coil and the power receipt side coil. Accordingly, this vehicle power supply apparatus can supply electric power to the power-supplied object mounted on the vehicle in an easy and efficient manner.

The non-magnetic portion may be a rear window member of the vehicle. That is, since the power receipt side coil is disposed in a relatively large area such as a rear window, the power receipt side coil can be made larger to obtain a larger inductance, and electric power can be efficiently transmitted and received by electromagnetic induction between the power transmission side coil and the power receipt side coil.

The power receipt side coil may be shared as a broadcast receiving antenna. This configuration can eliminate the need to separately install a broadcast receiving antenna in the vehicle, thereby allowing a reduction of the number of parts of the vehicle and the manufacturing costs thereof.

Further, the power transmission side coil may be formed such that a most outer circumference of the power transmission side coil is housed inside a most inner circumference portion of the power receipt side coil. This configuration can prevent a magnetic flux generated by the power transmission side coil from leaking from the power receipt side coil, thereby allowing an efficient generation of electromagnetic induction.

The power receipt side coil may be formed by arranging a plurality of metallic materials side by side so as not to be in contact with each other. Thereby, even if any metallic material is broken, the function as a power receipt side coil can be maintained as long as the remaining metallic materials are not broken.

The power transmitting unit may further include: a resonance generating module generating resonant current in conjunction with the power transmission side coil, an energy efficiency acquisition module acquiring an energy transfer efficiency between the power transmission side coil and the power receipt side coil based on the resonant current generated by the resonance generation module, and a frequency modulation module modulating a frequency of the resonant current generated by the resonance generating module based on the energy transfer efficiency acquired by the energy efficiency acquisition module. And the power receiving unit may further include a power receipt side capacitor generating resonant current in conjunction with the power receipt side coil. This configuration can more appropriately modulate a frequency of the resonant current flowing over the power transmission side coil and allows electric power to be efficiently transmitted and received between the power transmission side coil and the power receipt side coil using the resonance.

The power receipt side capacitor may be configured by a parasitic capacitance formed between mutually adjacent portions of the power receipt side coil. This configuration can eliminate the need to separately install a capacitor for constituting the resonant circuit in the non-magnetic portion, thereby allowing a reduction of the number of parts of the vehicle and the manufacturing costs thereof. Further, since the parasitic capacitance is smaller in temperature dependence than an ordinary capacitor, the resonant current generated in conjunction with the power receipt side coil can be more stabilized.

The power receiving unit may acquire a power supply state with respect to the power-supplied object and transmits information based on the acquired power supply state to the power transmitting unit. And the power transmitting unit may control a supply of electric current to the power transmission side coil based on information from the power receiving unit. When an enough electric power is supplied to the power-supplied object, it is possible to stop supplying electric power to the power-supplied object by stopping supplying an electric current to the power transmission side coil. This configuration can prevent an excess electric power from being supplied to the power-supplied object and electric power from being wasted by the power transmitting unit.

The power receiving unit may transmit information based on the power supply state from the power receipt side coil to the power transmission side coil via a signal having a frequency different from a frequency of resonant current generated between the power receipt side coil and the power receipt side capacitor. This configuration can eliminate the need to provide a dedicated communication unit for transmitting and receiving the information based on the power supply state of the power-supplied object between the power receiving unit and the power transmitting unit, and thus, can reduce the number of parts of the vehicle and manufacturing costs thereof.

The vehicle power supply apparatus may further includes: a determination notification module determining whether the power transmission side coil is appropriately positioned with respect to the power receipt side coil or not based on the resonant current generated between the power receipt side coil and the power receipt side capacitor and notifying that the power transmission side coil is not appropriately positioned with respect to the power receipt side coil. Thereby, the user can more appropriately position the power transmission side coil based on a notification from the determination notification unit, and thus can prevent the situation from being left as is in which the electric power is not well supplied to the power-supplied object due to a bad positional relation between the power transmission side coil and the power receipt side coil.

The power-supplied object may be an accumulator unit mounted on the vehicle, and the vehicle may have an electric motor outputting driving power using electric power from the accumulator unit. This configuration allows electric power to be accumulated in the accumulator unit while the vehicle is being stopped, and the electric power accumulated in the accumulator unit can be used to drive the electric motor to obtain a driving power.

The present invention is also directed to a vehicle window member made of a transparent non-magnetic body. The vehicle window member includes a coil disposed inside the transparent non-magnetic body, and the coil constitutes a resonant circuit together with a parasitic capacitance formed between mutually adjacent portions thereof.

This vehicle window member allows the coil to be disposed in a relatively large area such as a window member, and thus, the coil can be made larger to obtain a larger inductance. In addition, the coil disposed inside the transparent non-magnetic body constitutes the resonant circuit together with the parasitic capacitance formed between mutually adjacent portions, thereby eliminating the need to use another capacitor separately. Further, since the parasitic capacitance is smaller in individual difference and temperature dependence than an ordinary capacitor, a more stabilized resonant circuit can be configured. Accordingly, this vehicle window member allows electric power to be supplied to the power-supplied object mounted on the vehicle in an easy and efficient manner.

DESCRIPTION OF THE PREFERRED EMBODIMENTS

Hereinafter, the best mode for carrying out the invention will be described with reference to embodiments.

Figure 1:
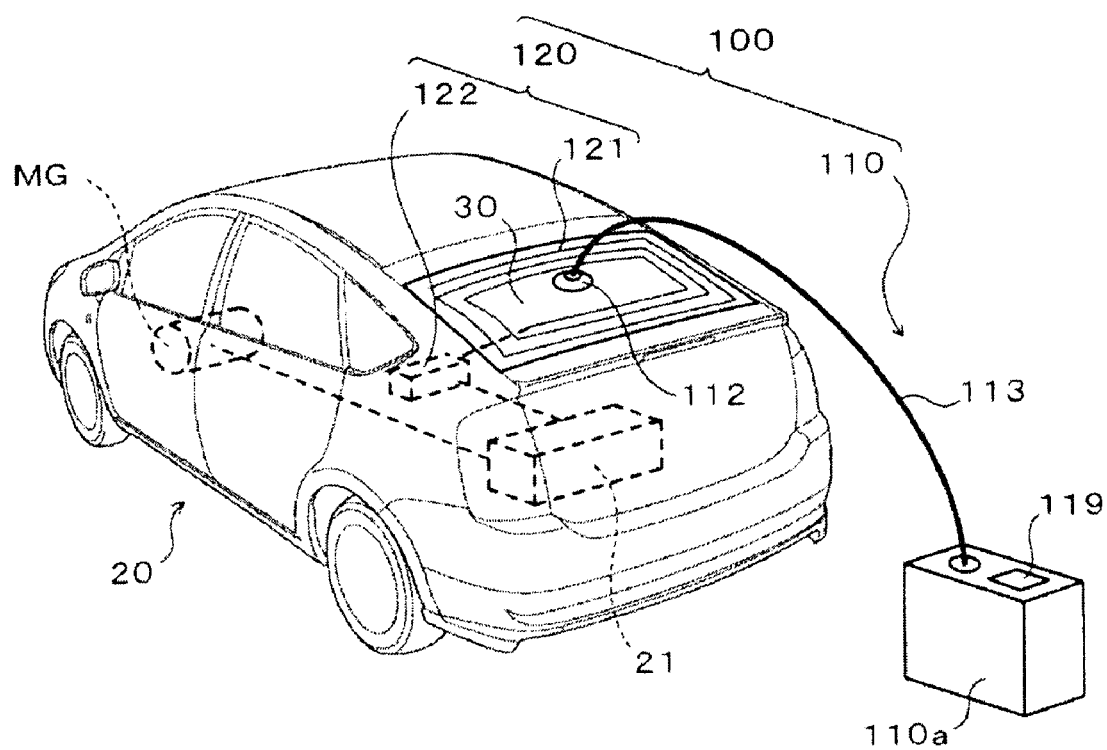
FIG. 1 is a perspective view illustrating a use state of a vehicle power supply apparatus 100 in accordance with an embodiment of the present invention.
Figure 2:
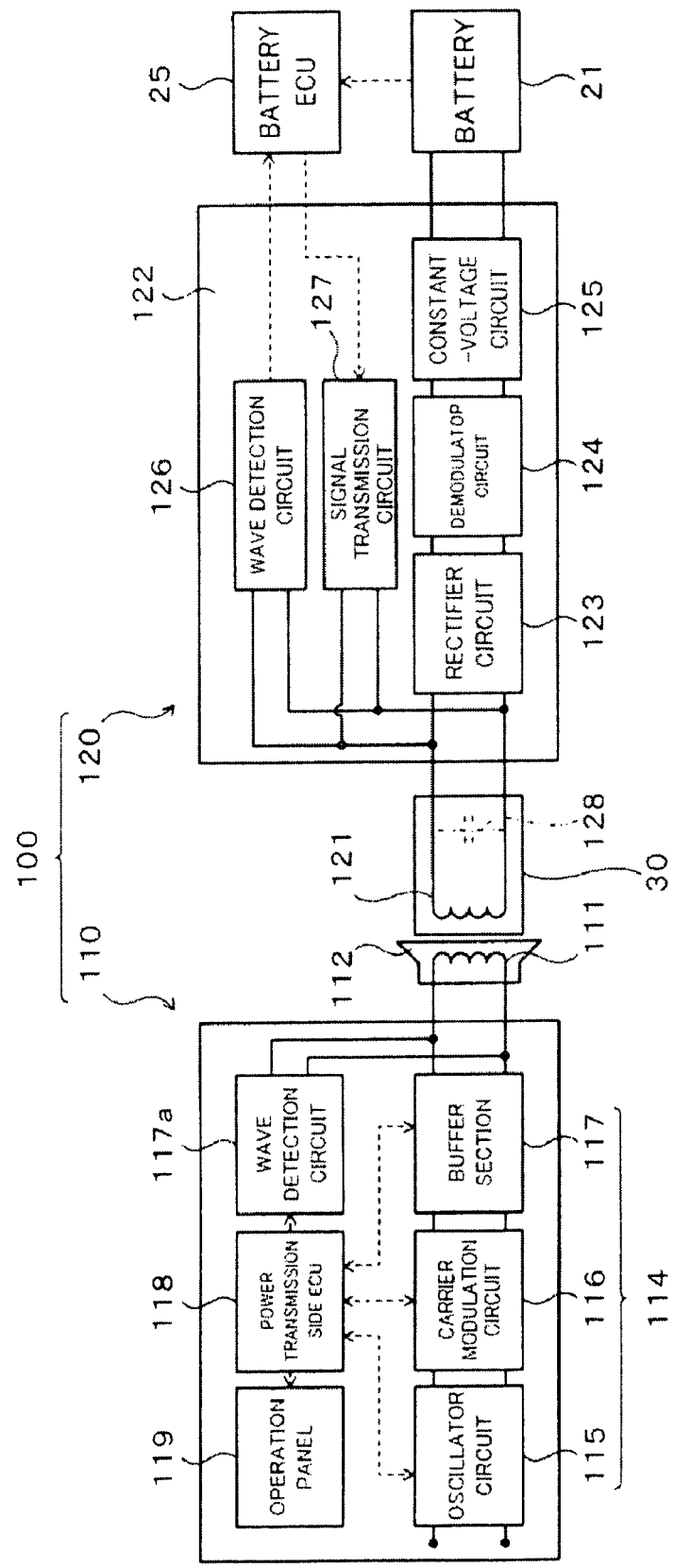
FIG. 2 is a block diagram of the vehicle power supply apparatus 100.

FIG. 1 is a perspective view illustrating a use state of a vehicle power supply apparatus 100 in accordance with an embodiment of the present invention; and FIG. 2 is a block diagram of the vehicle power supply apparatus 100. The vehicle power supply apparatus 100 of the present embodiment consists of a power transmitting unit 110 and a power receiving unit 120, and is used to supply electric power from outside the vehicle 20 to the vehicle 20 side by electromagnetic induction so as to charge a battery (secondary battery) 21 which is a power-supplied object mounted on the vehicle 20. According to the present embodiment, the vehicle 20 can transmit and receive electric power to and from the battery 21, and is configured as a hybrid vehicle including a motor MG capable of outputting a driving power and a regenerative braking force or an electric vehicle.

As shown in FIGS. 1 and 2, the power transmitting unit 110 includes a power transmission side coil 111 for generating an alternating magnetic field, a positioning member 112 such as a suction cup for positioning the power transmission side coil 111 in the vehicle 20, and a power transmission side circuit 114 for supplying an electric current to the power transmission side coil 111. The power transmission side coil 111 is buried (arranged) inside the positioning member 112 made of a resin material or the like, and is connected to the power transmission side circuit 114 through a cable 113 capable of winding with respect to, for example, a relatively long case 110a. The power transmission side circuit 114 is housed inside the case 110a, and, as shown in FIG. 2, and includes an oscillator circuit 115 transmitting a sine wave or a pulse wave (current) having a predetermined frequency; a carrier modulation circuit 116 modulating a current from the oscillator circuit 115; a buffer section 117 having a capacitor (not shown) constituting a resonant circuit together with the power transmission side coil 111, amplifying a voltage applied from the carrier modulation circuit 116 to a predetermined voltage value, and supplying it to the power transmission side coil 111; and a wave detection circuit 117a detecting an amplitude of a resonant current occurring in the power transmission side coil 111 and the like. Moreover, a power transmission side electronic control unit (hereinafter referred to as "power transmission side ECU") 118 controlling the power transmission side circuit 114, namely, the oscillator circuit 115, the carrier modulation circuit 116 and the buffer section 117, is disposed inside the case 110a of the power transmitting unit 110. The above described wave detection circuit 117a is connected to the power transmission side ECU 118. Further, an operation panel 119 having a display controlled by the power transmission side ECU 118 to display various kinds of information thereon, a warning lamp, a speaker generating a warning sound, various kinds of operation switches, and the like is arranged on the surface of the case 110a.

The power receiving unit 120 includes a power receipt side coil 121 generating an induced current based on an alternating magnetic field generated by the power transmission side coil 111; and a power receipt side circuit 122 supplying, to the battery 21, electric power based on the induced current generated by the power receipt side coil 121. As shown in FIG. 2, the power receipt side circuit 122 of the power receiving unit 120 has a rectifier circuit 123 connected to the power receipt side coil 121 and capable of rectifying the resonant current; a demodulator circuit 124 demodulating the current rectified by the rectifier circuit 123; and a constant-voltage circuit 125 converting the electric power from the demodulator circuit 124 to a predetermined voltage value and supplying it to the battery 21. In addition, the power receipt side circuit 122 includes a wave detection circuit 126 detecting an amplitude of a resonant current occurring in the power receipt side coil 121 and the like; and a signal transmission circuit 127 for setting a signal to be transmitted to the power transmitting unit 110 side through the power receipt side coil 121. These wave detection circuit 126 and the signal transmission circuit 127 are connected to a battery electronic control unit (hereinafter referred to as "battery ECU") 25 controlling the battery 21 mounted on the vehicle 20. It should be noted that the battery ECU 25 calculates the state of charge (SOC) of the battery 21, an input limit as a charge allowable power which is electric power allowed for charging the battery 21, and an output limit as a discharge allowable power which is electric power allowed for discharging the battery 21, and the like based on an inter-terminal voltage, a charge-discharge current, a temperature of the battery 21, and the like.

Figure 3:
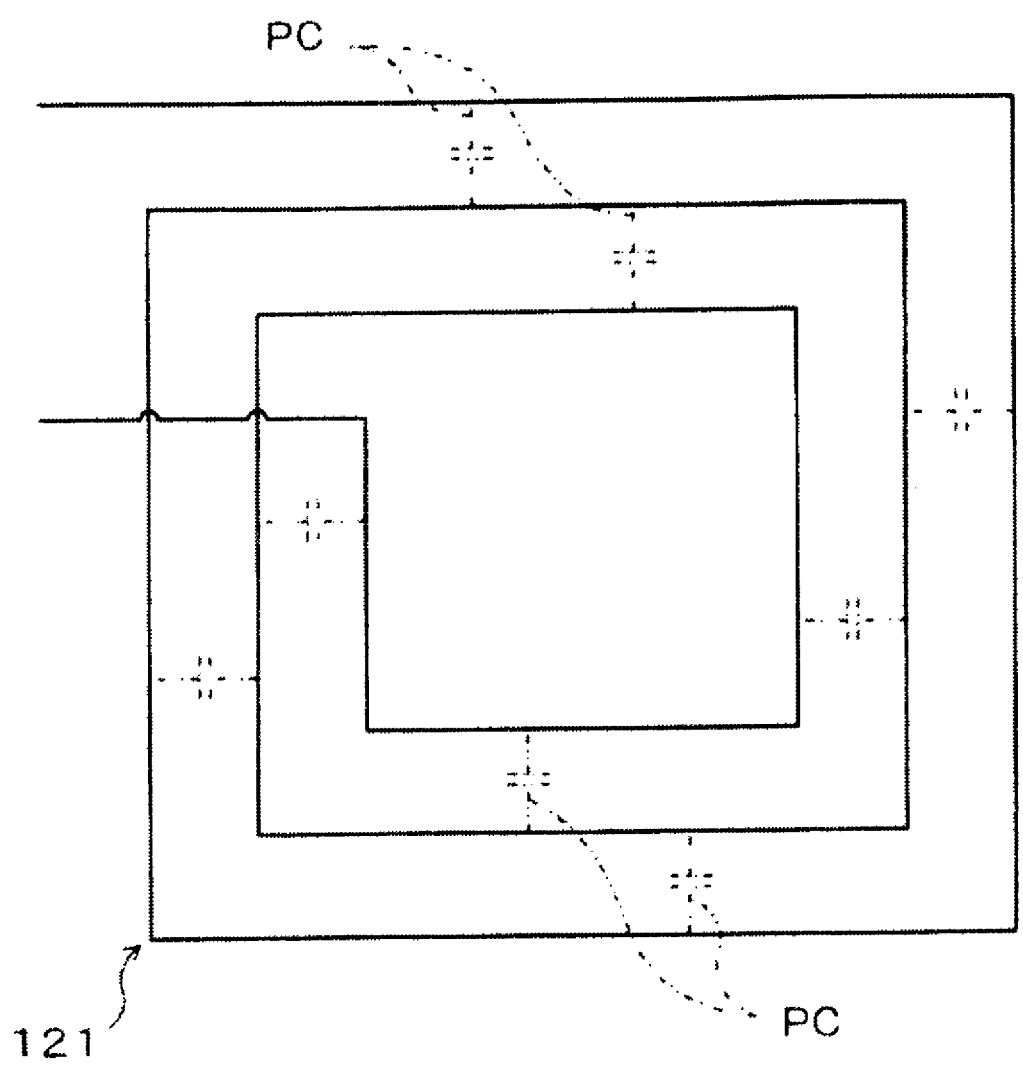
FIG. 3 is an explanatory drawing illustrating a configuration of a power receipt side coil 121.

Here, according to the present embodiment, as shown in FIG. 1, the power receipt side coil 121 of the power receiving unit 120 is disposed with respect to a rear window member (hereinafter referred to as "window member" as needed) 30 of the vehicle 20. The window member 30 is a so called laminated glass configured by laminating a plurality of transparent non-magnetic materials such as an outdoor side glass, an interlayer film, and an indoor side glass. According to the present embodiment, for example, a spirally wound power receipt side coil 121 made of a metallic material such as a very thin copper film is sandwiched between the outdoor side glass and the interlayer film so as to be positioned as close as possible to a peripheral edge of the window member 30. By doing so, the power receipt side coil 121 is buried inside the window member 30. Then, the power receipt side coil 121 is arranged with respect to the window member 30 such that the positioning member 112 of the power transmitting unit 110, namely, the power transmission side coil 111 is housed in the most inner circumference thereof. Such an arrangement of the power receipt side coil 121 in the rear window member 30 of the vehicle 20 can further increase the inductance. In addition, such an arrangement of the power receipt side coil 121 as close as possible to a peripheral edge of the window member 30 can prevent the power receipt side coil 121 from blocking a view behind the vehicle. Further, such an arrangement of the power transmission side coil 111 of the power transmitting unit 110 to be housed inside the most inner circumference portion of the power receipt side coil 121 can prevent a magnetic flux generated by the power transmission side coil 111 from leaking from the power receipt side coil 121. Still further, according to the present embodiment, as shown in FIG. 3, a parasitic capacitance (PC) is formed by adjusting the distance between the mutually adjacent portions of the metallic material constituting the power receipt side coil 121. The parasitic capacitance (PC) formed in this manner is used as a capacitor 128 (see FIG. 2) constituting the resonant circuit together with the power receipt side coil 121. This eliminates the need to install another capacitor separately in the power receipt side circuit 122, and can suppress the change in temperature of the inductance in comparison with installing another capacitor separately. It should be noted that this may be disposed inside a wall disposed near the peripheral edge of the window member 30.

Hereinafter, with reference to FIG. 4, a description will be given to the procedure for supplying electric power from outside the vehicle 20 to the vehicle 20 side and charging the battery 21 which is a power-supplied object, using the vehicle power supply apparatus 100 of the present embodiment configured as described above.

Figure 4:
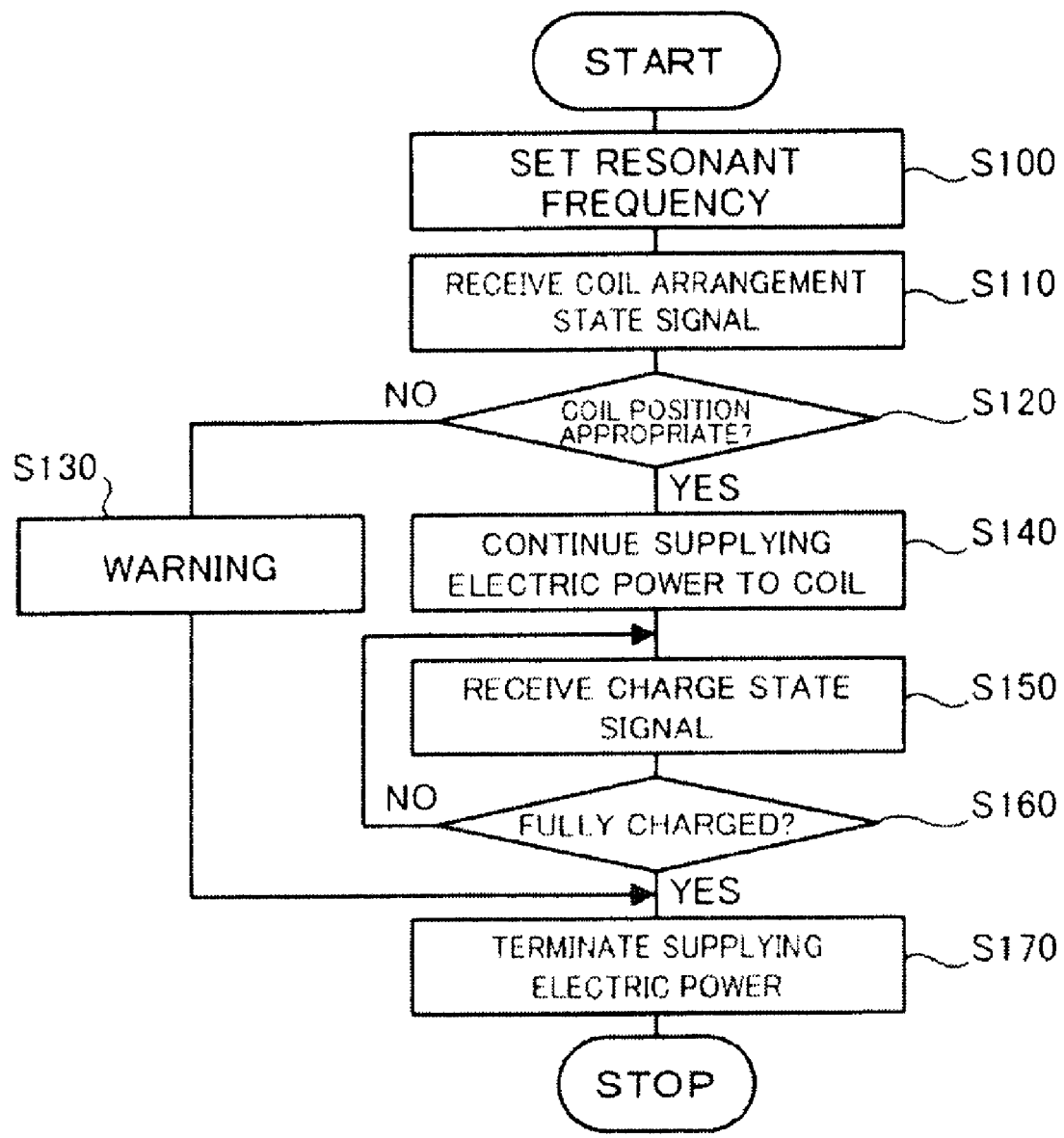
FIG. 4 is a flowchart illustrating a procedure for charging a battery 21 mounted on a vehicle 20 using the vehicle power supply apparatus 100.

FIG. 4 is a flowchart illustrating a procedure for charging the battery 21 mounted on the vehicle 20 using the vehicle power supply apparatus 100. FIG. 4 shows a process executed by the power transmission side ECU 118 of the power transmitting unit 110 when a user positions the power transmission side coil 111, namely, the positioning member 112 with respect to the rear window member 30 of the vehicle 20, and a power supply start switch (not shown) of the power transmitting unit 110 is turned on. That is, when the power supply start switch is turned on, the power transmission side ECU 118 starts to supply electric power from the oscillator circuit 115 and the carrier modulation circuit 116 to the power transmission side coil 111 and controls the carrier modulation circuit 116 based on the amplitude of the resonant current detected by the wave detection circuit 117a and the like (Step S100). That is, when the positioning member 112 is used to position the power transmission side coil 111 in the window member 30 of the vehicle 20, a parasitic capacitance and the like formed between the power transmission side coil 111 and the power receipt side coil 121 also changes the resonant current frequency occurring in the power transmission side coil 111 and a capacitor of the buffer section 117. Therefore, at a stage in which the power transmission side coil 111 is positioned with respect to the window member 30 of the vehicle 20, a frequency capable of efficiently transmitting and receiving electric power is searched for and a current from the oscillator circuit 115 is modulated as needed by the carrier modulation circuit 116. By doing so, a frequency of the resonant current (resonant frequency) occurring in the power transmission side coil 111 and the like can be set to a value capable of efficiently transmitting and receiving electric power to and from the power receipt side coil 121.

When the resonant frequency is set in this manner, the power transmission side ECU 118 controls the buffer section 117 and the like so as to supply a current to the power transmission side coil 111 with the set resonant frequency maintained, and in this state, waits until a coil arrangement state signal is transmitted from the power receiving unit 120. Here, after the resonant frequency is set in Step S100, at the power receiving unit 120 side, the wave detection circuit 126 detects a resonant current amplitude occurring in the power receipt side coil 121 (and the capacitor 128, namely, the parasitic capacitance (PC)) by electromagnetic induction based on a magnetic flux generated by the power transmission side coil 111, and transmits the resonant current amplitude to the battery ECU 25. At the time when a predetermined time has elapsed since the first signal was received from the wave detection circuit 126, if the resonant current amplitude is equal to or greater than a predetermined threshold, the battery ECU 25 determines that the arrangement state of the power transmission side coil 111 is appropriate and the power transfer efficiency is enough. On the contrary, at the time when a predetermined time has elapsed since the first signal was received from the wave detection circuit 126, if the resonant current amplitude is less than a predetermined threshold, the battery ECU 25 determines that the arrangement state of the power transmission side coil 111 is not appropriate and the power transfer efficiency is not enough. This allows a precise determination as to whether the power transmission side coil 111 is appropriately positioned with respect to the rear window member 30 of the vehicle 20, namely, the power receipt side coil 121 based on the resonant current occurring in the power receipt side coil 121.

Then, according to the above determination result, the battery ECU 25 instructs the signal transmission circuit 127 to transmit a coil arrangement state signal indicating whether the arrangement state of the power transmission side coil 111 is appropriate or not. When the instruction is received from the battery ECU 25, the signal transmission circuit 127 sets a pulse signal having a frequency different from the resonant current frequency occurring in the power receipt side coil 121 and the like as well as indicating whether the arrangement state of the power transmission side coil 111 is appropriate or not, and supplies the pulse signal to the power receipt side coil 121 as a coil arrangement state signal. The coil arrangement state signal is transmitted from the power receipt side coil 121 to the power transmission side coil 111, and is received by the power transmission side ECU 118 through the buffer section 117 and the like (Step S110). Such a transmission of the coil arrangement state signal which is a pulse signal having a frequency different from the resonant current frequency occurring in the power receipt side coil 121 and the like from the power receipt side coil 121 to the power transmission side coil 111 can eliminate the need to use a dedicated communication device, that is, can reduce the number of parts and manufacturing costs to notify the power transmitting unit 110 from the power receiving unit 120 whether the arrangement state of the power transmission side coil 111 is appropriate or not.

When the coil arrangement state signal is received in Step S110, the power transmission side ECU 118 determines, based on the coil arrangement state signal, whether the power transmission side coil 111 is appropriately positioned with respect to the window member 30, namely, the power receipt side coil 121 (Step S120). If a determination is made that the power transmission side coil 111 is not appropriately positioned with respect to the window member 30, the power transmission side ECU 118 displays a warning message on a screen of the operation panel 119, indicating that the power transmission side coil 111 is not appropriately positioned, lights a warning lamp, or generates a warning sound from a speaker (Step S130). Then, the power transmission side ECU 118 terminates the oscillator circuit 115 and the like to stop supplying electric power to the power transmission side coil 111, thereby stopping supplying electric power from the power transmitting unit 110 to the power receiving unit 120 (Step S170), and suspends the process of FIG. 4. By doing so, if the power transmission side coil 111 is not appropriately positioned with respect to the window member 30, namely, the power receipt side coil 121, the user can be notified that the power transmission side coil 111 needs to be repositioned. Accordingly, this can prevent the vehicle power supply apparatus 100 from being left operating in a state in which the electric power is not efficiently supplied to the vehicle 20 side.

On the contrary, if a determination is made in Step S120 that the power transmission side coil 111 is appropriately positioned with respect to the window member 30, the power transmission side ECU 118 continues a control for supplying an electric current to the power transmission side coil 111 with the resonant frequency set in Step S100 being maintained (Step S140). Thereby, in a state in which the resonant current frequency occurring in the power transmission side coil 111 is approximately matched with the resonant current frequency occurring in the power receipt side coil 121, electric power can be efficiently supplied by electromagnetic induction from the power transmitting unit 110 to the power receiving unit 120 through the power transmission side coil 111 and the power receipt side coil 121, and the electric power can be supplied to the battery 21 through the constant-voltage circuit 125 to charge the battery 21.

When a determination is made to continue supplying the electric power to the power transmission side coil 111 in Step S140, the power transmission side ECU 118 receives a charge state signal from the power receiving unit 120 (Step S150). Here, the battery ECU 25 connected to the power receiving unit 120 calculates a state of charge (SOC) of the battery 21 based on the charge-discharge current thereof, and determines whether the state of charge (SOC) is equal to or greater than a predetermined reference value. Then, according to the determination result, the battery ECU 25 instructs the signal transmission circuit 127 to transmit a charge state signal indicating whether the charge state of the battery 21 is a fully charged state or not. When the instruction is received from the battery ECU 25, the signal transmission circuit 127 sets a pulse signal having a frequency different from the resonant current frequency occurring in the power receipt side coil 121 and the like as well as indicating the charge state of the battery 21 and supplies the pulse signal to the power receipt side coil 121 as the charge state signal. The charge state signal is transmitted from the power receipt side coil 121 to the power transmission side coil 111, and is received by the power transmission side ECU 118 through the buffer section 117 and the like (Step S150). Such a transmission of the charge state signal which is a pulse signal having a frequency different from the resonant current frequency occurring in the power receipt side coil 121 and the like from the power receipt side coil 121 to the power transmission side coil 111 can eliminate the need to use a dedicated communication device, that is, can reduce the number of parts and manufacturing costs to notify the power transmitting unit 110 from the power receiving unit 120 of the charge state of the battery 21.

The power transmission side ECU 118 which received the charge state signal in Step S150 determines, based on the charge state signal from the power receiving unit 120, whether the battery 21 is fully charged or not (Step S160). If the battery 21 is not fully charged, the processes in Steps S150 and S160 are executed again. On the contrary, if a determination is made in Step S160 that the battery 21 is fully charged, the power transmission side ECU 118 terminates the oscillator circuit 115 and the like to stop supplying electric power to the power transmission side coil 111, thereby stopping supplying electric power from the power transmitting unit 110 to the power receiving unit 120 (Step S170). Then, the present process of charging the battery 21 is terminated. Therefore, the vehicle power supply apparatus 100 of the present embodiment can prevent overcharge of the battery 21 and a waste of the electric power by the power transmitting unit 110. Such an above described method of accumulating electric power in the battery 21 while the vehicle 20 is being stopped can obtain a driving power by driving the motor MG using the electric power accumulated in the battery 21 when the vehicle 20 runs next.

As described above, the vehicle power supply apparatus 100 of the present embodiment uses the positioning member 112 to position the power transmission side coil 111 in the rear window member 30 which is a non-magnetic portion of the vehicle 20, thereby easily changing the positional relation between the power transmission side coil 111 and the power receipt side coil 121 to a chargeable state. In addition, since the power receipt side coil 121 is disposed in the rear window member 30 which is a non-magnetic portion of the vehicle 20, a magnetic flux generated by the power transmission side coil 111 can be easily passed through inside the power receipt side coil 121 free from the effects of a magnetic flux generated by a magnetic portion of the vehicle 20, thereby allowing an efficient power transfer between the power transmission side coil 111 and the power receipt side coil 121. Accordingly, the vehicle power supply apparatus 100 can supply electric power to the vehicle 20 side in an easy and efficient manner to charge the battery 21 which is a power-supplied object.

In addition, since the power receipt side coil 121 is disposed in a relatively large area such as a rear window of the vehicle 20 which is a non-magnetic portion thereof, the power receipt side coil 121 can be made larger to obtain a larger inductance, electric power can be efficiently transmitted and received by electromagnetic induction between the power transmission side coil 111 and the power receipt side coil 121. Further, according to the above present embodiment, such a configuration in which the most outer circumference of the power transmission side coil 111 is housed inside the most inner circumference portion of the power receipt side coil 121 can prevent a magnetic flux generated by the power transmission side coil 111 from leaking from the power receipt side coil 121, thereby allowing an efficient generation of electromagnetic induction. In addition, according to the above present embodiment, a parasitic capacitance (PC) formed between the mutually adjacent portions of the power receipt side coil 121 is used to configure the power receipt side capacitor 128. This configuration can eliminate the need to separately install a capacitor for constituting the resonant circuit in the window member 30 as the non-magnetic portion, thereby allowing a reduction of the number of parts of the vehicle 20 and the manufacturing costs thereof. Further, since the parasitic capacitance (PC) is smaller in individual difference and temperature dependence than an ordinary capacitor, the resonant current generated in conjunction with the power receipt side coil 121 can be more stabilized.

Figure 5:
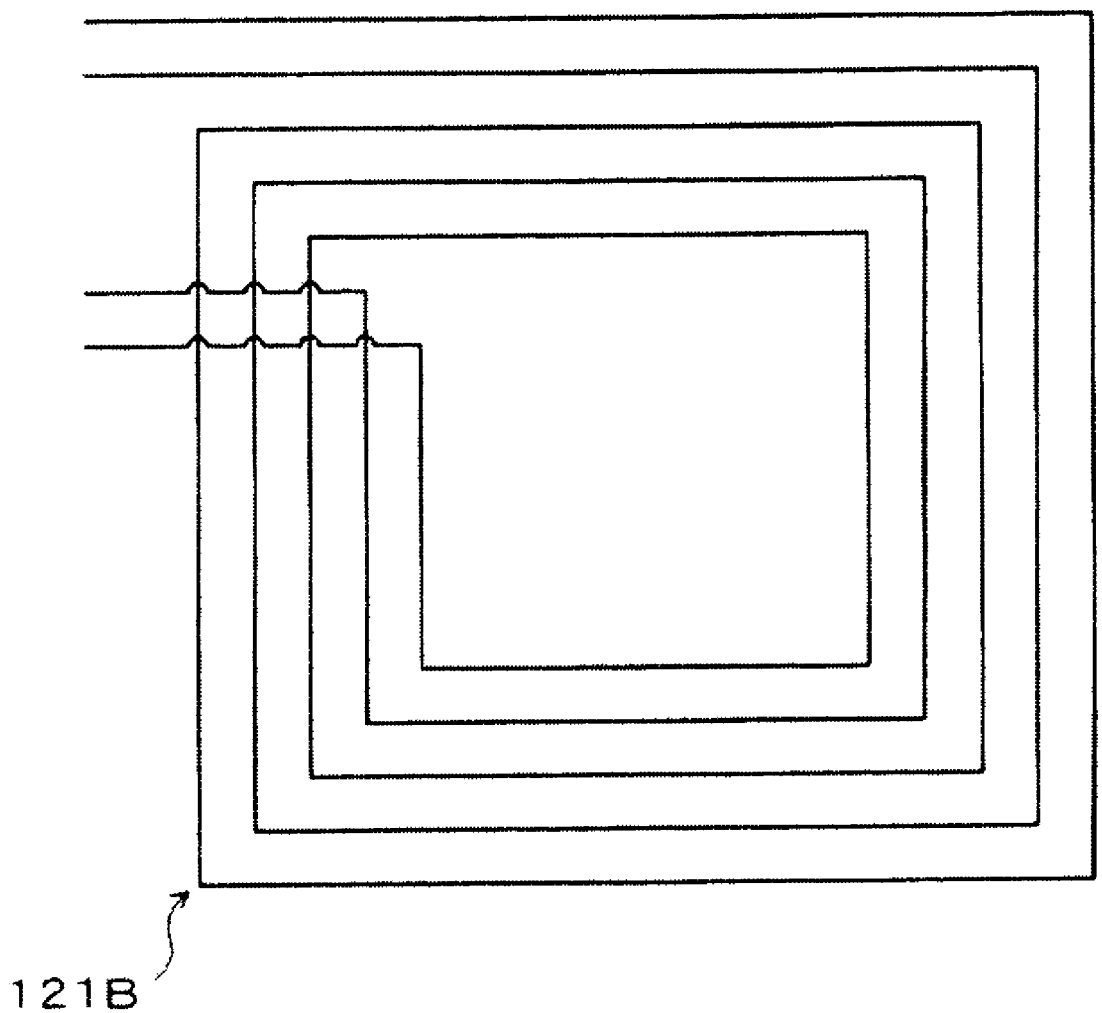
FIG. 5 is an explanatory drawing illustrating a variation of the power receipt side coil 121.

It should be noted that the power receipt side coil 121 may be disposed in any portion such as a bumper of the vehicle 20 other than the rear window member 30 as long as it is a non-magnetic portion. In addition, the power receipt side coil 121 may be shared as an antenna for receiving a broadcast such as the AM broadcast and the FM broadcast. This configuration can eliminate the need to separately install a broadcast receiving antenna in the vehicle 20, thereby allowing a reduction of the number of parts of the vehicle 20 and the manufacturing costs thereof. Further, a coil formed by arranging a plurality of metallic materials side by side so as not to contact with each other such as a power receipt side coil 121B shown in FIG. 5 may be disposed in a non-magnetic portion of the window member 30 and the like. According to such a power receipt side coil 121B, even if any metallic material is broken, the power receipt side coil 121B can maintain the function as a coil as long as the remaining metallic materials are not broken.

Further, the power transmitting unit 110 of the present embodiment includes the buffer section 117 containing a capacitor generating a resonant current in conjunction with the power transmission side coil 111; the wave detection circuit 117a and the power transmission side ECU 118 monitoring the resonant current amplitude as an energy transfer efficiency between the power transmission side coil 111 and the buffer section 117; and the carrier modulation circuit 116 modulating a frequency of the resonant current generated by the buffer section 117 based on the resonant current amplitude indicating the energy transfer efficiency. Therefore, the vehicle power supply apparatus 100 of the present embodiment can more appropriately modulate a frequency of the resonant current flowing over the power transmission side coil 111, and allows electric power to be efficiently transmitted and received between the power transmission side coil 111 and the power receipt side coil 121 using the resonance therebetween.

Moreover, at the power receiving unit 120 side of the present embodiment, the state of charge (SOC) indicating a power supply state with respect to the battery 21 as the power-supplied object is obtained by the battery ECU 25, and a charge state signal indicating information about the charge state of the battery 21 based on the state of charge (SOC) is transmitted from the power receiving unit 120 to the power transmitting unit 110. The power transmitting unit 110 side controls to supply an electric current to the power transmission side coil 111 based on the charge state signal from the power receiving unit 120. By doing so, an enough electric power is supplied to the vehicle 20 side. Then, when the battery 21 is fully charged, it is possible to stop supplying electric power to the battery 21 by stopping supplying electric current to the power transmission side coil 111, thereby preventing overcharge of the battery 21 and a waste of the electric power by the power transmitting unit 110.

According to the above present embodiment, a determination is made at the power receiving unit 120 side as to whether the power transmission side coil 111 is appropriately positioned with respect to the power receipt side coil 121 based on the resonant current (the amplitude) generated between the power receipt side coil 121 and the power receipt side capacitor 128 (parasitic capacitance (PC)). According to such a determination result, the coil arrangement state signal which is a pulse signal indicating whether the arrangement state of the power transmission side coil 111 is appropriate or not is transmitted from the power receiving unit 120 to the power transmitting unit 110 through the power receipt side coil 121 and the power transmission side coil 111. Then, if the coil arrangement state signal indicates that the power transmission side coil 111 is not appropriately positioned with respect to the power receipt side coil 121, a predetermined warning is displayed on the screen or a warning sound is generated from a speaker. Thereby, the user can more appropriately position the power transmission side coil 111 based on these warnings (notifications) and thus can prevent the situation from being left as is in which electric power is not well supplied to the battery 21 due to a bad positional relation between the power transmission side coil 111 and the power receipt side coil 121.

Further the power receiving unit 120 can transmit information indicating whether the arrangement state of the power transmission side coil 111 is appropriate or not and indicating the charge state of the battery 21, from the power receipt side coil 121 to the power transmission side coil 111 by way of a pulse signal having a frequency different from the resonant frequency of a resonant current generated between the power receipt side coil 121 and the power receipt side capacitor 128 (parasitic capacitance (PC)). This can eliminate the need to provide a dedicated communication unit for transmitting and receiving these pieces of information between the power receiving unit 120 and the power transmitting unit 110, and thus, can reduce the number of parts and manufacturing costs of the vehicle 20. However, it is obvious that a dedicated communication device may be disposed between the power transmitting unit 110 and the power receiving unit 120.

Here, a description will be given to the correspondence between the major components of the above embodiments and the major components of the present invention described in the SUMMARY OF THE INVENTION. That is, the vehicle power supply apparatus 100 supplying electric power by electromagnetic induction from outside the vehicle 20 to the battery 21 mounted thereon described in the above embodiments corresponds to the "vehicle power supply apparatus" described in the SUMMARY OF THE INVENTION; the power transmitting unit 110 including the power transmission side coil 111 for generating an alternating magnetic field, the positioning member 112 for positioning the power transmission side coil 111 in the vehicle 20, and the power transmission side circuit 114 for supplying an electric current to the power transmission side coil 111 corresponds to the "power transmitting unit"; and the power receiving unit 120 including the power receipt side coil 121 disposed in the rear window member 30 which is a non-magnetic portion of the vehicle 20 and generating an induced current based on the alternating magnetic field generated by the power transmission side coil 111 and the power receipt side circuit 122 supplying the electric power based on the induced current generated by the power receipt side coil 121 to the power-supplied object corresponds to the "power receiving unit". In addition, the buffer section 117 capable of generating a resonant current in conjunction with the power transmission side coil corresponds to the "resonance generation module"; the wave detection circuit 117a and the power transmission side ECU 118 calculating the energy efficiency by monitoring the amplitude of a resonant current generated by the buffer section 117 corresponds to the "energy efficiency acquisition module"; the carrier modulation circuit 116 modulating the frequency of a resonant current generated by the buffer section 117 based on the resonant current amplitude corresponds to the "frequency modulation module"; and the capacitor 128 using the parasitic capacitance (PC) generated by the power receipt side coil 121 corresponds to the "power receipt side capacitor". Further, a combination of the battery ECU 25, the wave detection circuit 126 of the power receiving unit 120, the power receipt side coil 121 and the power transmission side coil 111, the power transmission side ECU 118, the operation panel 119, and the like corresponds to the "determination notification unit".

At any rate, since the correspondence between the major components of the above embodiments and the major components of the present invention described in the SUMMARY OF THE INVENTION is an example for explaining the best mode for carrying out the invention, this does not limit the components of the present invention described in the SUMMARY OF THE INVENTION. That is, the embodiment is just an example of the present invention described in the SUMMARY OF THE INVENTION, and the present invention described in the SUMMARY OF THE INVENTION should be construed based on the description therein.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The present invention can be used in a manufacturing industry or the like of a vehicle power supply apparatus and a vehicle window member.

The disclosure of Japanese Patent Application No. 2008-012848 filed Jan. 23, 2008 including specification, drawings and claims is incorporated herein by reference in its entirety.

What is claimed is:

1. A vehicle power supply apparatus supplying electric power by electromagnetic induction from outside a vehicle to an accumulator unit mounted in the vehicle, the vehicle power supply apparatus comprising:
    a power transmitting unit including a power transmission side coil for generating an alternating magnetic field, a positioning device for positioning the power transmission side coil with respect to the vehicle, and a power transmission side circuit supplying electric current to the power transmission side coil; and
    a power receiving unit including a power receipt side coil disposed in a rear window member of the vehicle and generating induced current based on the alternating magnetic field generated by the power transmission side coil, and a power receipt side circuit supplying electric power based on the induced current generated by the power receipt side coil to the accumulator unit.

2. A vehicle power supply apparatus according to claim 1, wherein the power receipt side coil is shared as a broadcast receiving antenna.

3. A vehicle power supply apparatus according to claim 1, wherein the power transmission side coil is formed such that a most outer circumference of the power transmission side coil is housed inside a most inner circumference portion of the power receipt side coil.

4. A vehicle power supply apparatus according to claim 1, wherein the power receipt side coil is formed by arranging a plurality of metallic materials side by side so as not to be in contact with each other.

5. A vehicle power supply apparatus according to claim 1, wherein the power transmitting unit further includes: a resonance generating module generating resonant current in conjunction with the power transmission side coil, an energy efficiency acquisition module acquiring an energy transfer efficiency between the power transmission side coil and the power receipt side coil based on the resonant current generated by the resonance generation module, and a frequency modulation module modulating a frequency of the resonant current generated by the resonance generating module based on the energy transfer efficiency acquired by the energy efficiency acquisition module; and
    wherein the power receiving unit further includes a power receipt side capacitor generating resonant current in conjunction with the power receipt side coil.

6. A vehicle power supply apparatus according to claim 5, wherein the power receipt side capacitor is configured by a parasitic capacitance formed between mutually adjacent portions of the power receipt side coil.

7. A vehicle power supply apparatus according to claim 5, wherein the power receiving unit acquires a power supply state with respect to the power-supplied object and transmits information based on the acquired power supply state to the power transmitting unit; and wherein the power transmitting unit controls a supply of electric current to the power transmission side coil based on information from the power receiving unit.

8. A vehicle power supply apparatus according to claim 7, wherein the power receiving unit transmits information based on the power supply state from the power receipt side coil to the power transmission side coil via a signal having a frequency different from a frequency of resonant current generated between the power receipt side coil and the power receipt side capacitor.

9. A vehicle power supply apparatus according to claim 5, further comprising:

a determination notification module determining whether the power transmission side coil is appropriately positioned with respect to the power receipt side coil or not based on the resonant current generated between the power receipt side coil and the power receipt side capacitor and notifying that the power transmission side coil is not appropriately positioned with respect to the power receipt side coil.

10. A vehicle power supply apparatus according to claim 1, wherein the vehicle has an electric motor outputting driving power using electric power from the accumulator unit.

* * * * *